(12) United States Patent
Lewak

(10) Patent No.: US 8,938,453 B2
(45) Date of Patent: Jan. 20, 2015

(54) ITEM COUNTING IN GUIDED INFORMATION ACCESS SYSTEMS

(75) Inventor: Jerzy Jozef Lewak, Yorba Linda, CA (US)

(73) Assignee: SpeedTrack, Inc., Yorba Linda, CA (US)

( * ) Notice: Subject to any disclaimer, the term of this patent is extended or adjusted under 35 U.S.C. 154(b) by 0 days.

(21) Appl. No.: 13/186,358

(22) Filed: Jul. 19, 2011

(65) Prior Publication Data

US 2013/0041922 A1 Feb. 14, 2013

(51) Int. Cl.
*G06F 17/30* (2006.01)
*G06F 7/00* (2006.01)
(52) U.S. Cl.
CPC .............................. *G06F 17/30386* (2013.01)
USPC ......................... 707/737; 707/738; 707/740
(58) Field of Classification Search
CPC .................................................. G06F 17/30412
USPC ........................................ 707/737, 738, 740
See application file for complete search history.

(56) References Cited

U.S. PATENT DOCUMENTS 8,024,324 B2 * 9/2011 Amitay et al. ................ 707/715
2011/0154254 A1 * 6/2011 Singh ............................ 715/810

* cited by examiner

*Primary Examiner* — Mariela Reyes
(74) *Attorney, Agent, or Firm* — Klein, O'Neill & Singh, LLP

(57) ABSTRACT

Methods of counting the number of matching items (more generally finding objects) indirectly associated with each detail selector (more generally another object) available for selection in a database search system or generally useful in other applications are disclosed. In some embodiment the method uses a set of matching items and traverses to each indirectly associated detail selector via a traversal through each associated entity, and a traversal through each detail selector associated with that entity. The method is easily extendable to the case of multiple entity levels. In some embodiments the method first creates an association matrix directly associating items to selectors and allowing item determination or counting more simply.

7 Claims, 14 Drawing Sheets

Product Matrix (Indirect Association Detail Selector-Item Matrix)

|     | $i_1$ | $i_2$ | $i_3$ | $i_4$ | $i_5$ | $i_6$ | row |
|-----|---|---|---|---|---|---|-----|
| 402 $d_1$ | 1 | 1 | 1 | 1 | 1 | 0 | 1 |
| 404 $d_2$ | 1 | 1 | 1 | 0 | 0 | 0 | 2 |
| 406 $d_3$ | 1 | 0 | 1 | 1 | 0 | 0 | 3 |
| 408 $d_4$ | 0 | 0 | 1 | 1 | 1 | 0 | 4 |
| 410 $d_5$ | 0 | 0 | 0 | 1 | 1 | 1 | 5 |
| 412 $d_6$ | 0 | 0 | 1 | 1 | 1 | 0 | 6 |
| column | 1 | 2 | 3 | 4 | 5 | 6 | |

ITEM COUNTING IN GUIDED INFORMATION ACCESS SYSTEMS

BACKGROUND

1. Technical Field

The present disclosure relates generally to improvements in databases comprising structured and unstructured data. More specifically it describes methods of improving the associative information shown to the user and dynamically adjusted during user's navigation through the information in the data.

2. Background

Access to information in databases has recently been made much more convenient by what is called by some, Faceted Navigation and by others Guided Information Access or GIA. In simplified terms GIA allows users to choose terms (called selectors) to describe the data items of interest which are then made available as matching items. The selectors can be either descriptive of the contents of data items, or terms present in the content, or both.

One of the very useful features of GIA is that the selectors available to the user for choosing are always adjusted to make sure that the user always chooses only selectors which, combined with those previously chosen, guarantee at least one matching item. Another very useful feature of GIA is that the counts of items associated with each selector can be displayed and adjusted to be always current as the user narrows the description with additional selector choices.

In Faceted Navigation systems, selectors are directly associated with items and used to select (find) matching items. When items contain information about multiple entities of the same kind, such as multiple people, vehicles, places etc., descriptions of items using selectors, directly associated with items, may find items that do not contain the described entities. For example, in a database of incidents, where any incident may involve multiple people, if you choose a person's eye color as brown and a person's ethnicity as European, and both selectors are associated directly with items, you will find items with such a person (if they exist) but you will also find items in which there are two or more people, one of which has brown eyes and a different person who is European. This is the data ambiguity problem. This problem is solved in GIA by using entities. When a user chooses selectors, Technology for Information Engineering (TIE), the server technology enabling GIA, matches entities and then those matched entities match the items which include those entities. Sometimes multiple levels of entities may be needed. For example, when in a single item multiple people have multiple addresses, each address can be an entity which is directly associated with the person entity.

When, for example, an item is an incident involving multiple people and the selectors are terms describing the people, the shown counts associated with each selector can be either counts of people, or counts of items, or both. So for example, in the case when a total of 100 matching items contains a cumulative total of 26 people (the entities) the selector Brown Eyes may show a count of 13 entities (which means people) and 10 items (meaning incidents), meaning that there are 13 people with brown eyes and they are distributed amongst 10 incidents.

The counts of items can show the user how many items involve a particular entity description. So for example if the items are incidents of crimes each associated with a selector descriptive of the type of crime, each involving some number of people, it would be very useful to see how many crimes of each type occurred. Each crime type is described by a selector, and the item counts associated with each selector are then counts of the respective incidents or items involving that crime type.

The calculation of entities (such as people) associated with each selector is a relatively fast and simple task for a computer program to perform. However, the evaluation of the item counts is a more time consuming computer task and so requires additional effort in the design of the methods to achieve a suitably fast, efficient response. Such calculations have to be performed after each user choice of a selector. A fast response is very desirable because the user would be inconvenienced if after each choice of a selector the response is appreciably delayed. It is the objective of this present disclosure to describe suitably fast systems, methods, and non-transitory computer-readable storage media for counting items in this and any similar contexts.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing counts of items associated with each selector in a GIA search interface, in detail selector groups using intermediary selector associations with entities. For example, in a criminal database, a user can search for a particular item in a database, i.e., an incident report, which is characterized by details such as physical characteristics of each person described in the report, characteristics of each car, details of each crime, etc. In such an instance, each person, car, and crime may need to be treated as entities. Each person, car, and crime has additional details or characteristics that describe them and each of those details of the entities can be described by a detail selector and appear in the incident report.

Continuing with the preceding example, if a user of a criminal database wanted to search for an incident report based on a robbery committed by a person, driving a particular car, the user could be presented with a plurality of detail selectors describing details of entities (such as persons and cars) associated with the incident report. In general, when items contain structure, that is they contain data about multiple entities of the same kind (such as people, vehicles etc.), the associations of selectors directly with items will not distinguish between entities of the same kind present in the same item, causing data ambiguity. This problem is solved by using entities.

Using entities creates an additional level of complexity for many data functions. One such function, that is common in GIA systems, is calculation of item counts. Item counts identify the number of currently matching items in a database associated with a displayed detail selector. Since entities create an intermediate relationships between a detail selector and an item, the presence of the entities complicates the calculation of the counts of items because they are indirectly rather than directly associated with selectors. For items directly associated with detail selectors, the counting process is computationally simple because it traverses each item and for each item the associated selectors, incrementing the selector count of each such selector.

Two item counting method embodiments, for implementations using GIA are described. The first method, called the multiple matrix method, uses two or more association matrices. In the simplest case of just one level of entities, the Item-Entity (item to entity) matrix and the Entity-Detail Selector (entity to detail selector) matrix. When more levels of entities are present, more corresponding association matrices are used. The second method, called the single matrix method, converts the multiple association matrices to a single direct association matrix between items and detail selectors and uses that for item counting.

Counts of items or entities associated with each selector comprise the, so called, reverse query. Counts of items associated with each selector are often performed even when displaying them may not be required, because the extra effort required is not significant when the counts are those of items in bare groups, or the counts are of entities, instead of items, in entity groups. However, evaluating the counts of associated items in entity groups does require significant extra effort. The multiple matrix method can be used to perform such item counts during the evaluation of the reverse query.

The reverse query is calculated using the results of the forward query. In a system using entities, the forward query evaluates the Boolean query of selectors the result of which is a set of matching entities and a set of matching items. The matching items are found by evaluating a computer generated Boolean query comprised of the matching entities. Evaluation of the item counts and optionally entity counts, associated with each selector can be performed using the following method steps.

Starting with the matching items set, iterate through each item, and perform the following steps for each item, using a Result List Of Selectors' Counts (RLSC) to store counts of items associated with each selector:

determine the subset of entities, associated with the current item, call it the entity subset (ES);

iterate through each entity member of the ES, and for each current entity, determine the subset of selectors associated with it. For each associated selector in this subset of selectors:

increment by one the item count in the item count column of the RLSC, provided the ID of the item being processed is not one that has already been counted as associated with that selector.

The conditional in the last listed step can be achieved by using two elements for each selector ID in the RLSC: the first storing the item count, the second storing the ID of the item which contributed last to the count. Then when determining whether to increment the count associated with a selector, the last contributed item ID, as stored in the second element of RLSC for that selector, is compared with the current one. Unless those two are the same, the increment in the count is made and the current item ID is written to the second element of the RLSC for that selector. If the two are the same, no change is made and the next selector is checked.

A method for computation of entity counts could be performed as follows:

determine that set of entities, the associated entities set, each of which is associated with at least one of the matching items;

for each entity in the associated entities set, determine the associated selectors and increment the entity count of each.

The single matrix method of item count evaluation needs only the description of the creation of the single matrix from multiple matrices. Once this is created, item counts are evaluated using the same steps as in the case of no entities present, which is the same as the calculation of entities described above.

In general terms the single matrix is the binary product (or Boolean conjunction) of the two matrices: the Item-Entity and the Entity-Detail Selector.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary single matrix of items to detail selectors derived from the product of the two example matrices of detail selectors to entities and entities to items.

DETAILED DESCRIPTION

Figure 1:
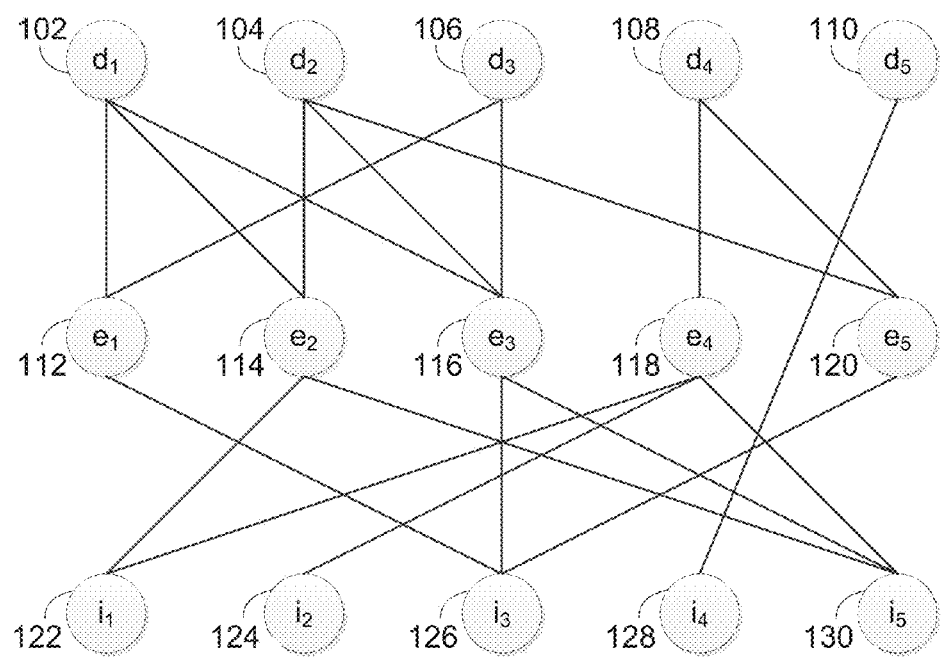
FIG. 1 illustrates an association graph of an exemplary database having detail selectors with direct and indirect associations to items.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for a database search interface that employs intermediate associations between items and selectors. Methods are disclosed for searching databases with the use of such intermediate associations. Such methods may preferably assist a user in information navigation though databases by displaying additional information about the data associations. For example, additional information may be derived from the process and made available to the user as part of the information navigation. Thus, a user (a person, entity, computer, computer program, etc.) may be interactively guided to updated derived information relating to the information he/she/it is searching.

To begin with, the following table offers some exemplary meanings of some terms.

| | |
|---|---|
| item, entity, detail selector | any data. each generally referred to as an element. |
| list | a collection of elements implemented in any convenient structure. |
| query | a single element. a plurality of elements and Boolean operators representing a logical expression. |
| selection or selecting | choosing by any person or computer instruction in a computer system. |
| user | any person or computer system, including part of any system, using the methods. A different user is possible for each instance of the use of the term. |

In all methods described herein it is understood that computer software implementations of such methods may use unique identifiers, for example simple integers, to reference any element. When a method refers to an element, such a reference must be understood as optionally exactly equivalent to a unique identifier of said element. At times software implementations may use a unique identifier as a reference to the location of the true unique identifier of an element. These too should be considered exact equivalents to the element itself.

The present disclosure may employ a search method where a user can select from a list of available categorical descriptions, characteristics, or other search input (generally referred to as "detail selectors") that, for example, describe the database entry(ies) or items he/she/it is looking for. Any resulting search entries from selecting one or more detail selectors are referred to as "matching items." Each detail selector reveals or describes one or more details about a matching item and may be selected by the user when performing a search of items with that detail. One exemplary embodiment is a criminal database where the detail selectors may include descriptions of age, height, weight, race, hair color, eye color, the crime committed, the date of the crime, and other details associated with the criminal records that are stored therein.

Detail selectors may also describe objects that are a part of the data in the items; these objects are known as "entities." In general, an entity can be a representation of an object, article, body, or assembly of data parts, etc. Examples of an entity include a person, a vehicle, an address, or even a sentence as represented by a group of unique words (all words in the sentence without duplicates). Referring back to the criminal database example above, an entity may be, for example, a person in a criminal report, a vehicle in an accident report, or a gun. As seen by the example graph of the associations represented in FIG. 1, an entity 112 can be an intermediate node between a detail selector 102 and an item 126, where the entity 112 is directly linked to the detail selector 102 and also to the item 126. An entity 112 represents an intermediate relationship between a detail selector 102 and an item 126. As such, entities indirectly link together (detail) selectors and items. Such work to establish entities in database association structures has been disclosed by application Ser. No. 12/223, 275 filed on Jan. 25, 2007 and published as U.S. 2010/ 0241649 ("the '649 publication"), and is incorporated by reference herein in its entirety.

Entities add another level of complexity in the associations metadata but allow for more efficient and accurate information navigation by providing additional related information and dynamically keeping it updated during navigation.

In some preferred embodiments, when a user of a database search interface chooses to select a detail selector or multiple detail selectors, the method finds all matching items associated with the detail selector or with the Boolean comprised of multiple detail selectors, and calculates and provides the number of matching items associated with each of the detail selectors in the database, usually also disabling from further choices selectors whose item counts are zero. These embodiments preferably calculate and provide these numbers as the user is performing his/her selection and does so on average responding in about one second or less, though sometimes, for larger databases and responses returning very long lists of selectors, the response time may be longer (measured from the time the user makes a selection to the time the numbers are available to the user). This enables the user to immediately see precisely how many matching items result if he/she were to choose and select a certain additional detail selector without even sending a further request or query.

Entities were first introduced in the '649 publication to solve the data ambiguity problem. To explain how entities function, a small portion of an example database association graph illustrated in FIG. 1 will be used. Referring to FIG. 1, the database contains detail selectors $d_1$ 102, $d_2$ 104, $d_3$ 106, $d_4$ 108, $d_5$ 110; entities $e_1$ 112, $e_2$ 114, $e_3$ 116, $e_4$ 118, $e_5$ 120; and items $i_1$ 122, $i_2$ 124, $i_3$ 126, $i_4$ 128, $i_5$ 130. The connecting lines between the detail selectors, entities, and items represent the associations. When a user chooses, inputs, and/or selects certain detail selectors, for example $d_1$ 102 and $d_2$ 104, the TIE system will automatically create and then evaluate the forward query. Assuming the selectors were automatically combined conjunctively in the query, the matching entities would be $e_2$ 114 and $e_3$ 116. Then the matching items are found by effectively creating and evaluating a query comprised of entities. In this example, the query searches for all items that are associated with any of the matching entities, in this case $e_2$ 114 and $e_3$ 116. This gives the matching items as $i_1$ 122, $i_3$ 126, and $i_5$ 130. Then the identified matching items and matching entities are used to automatically perform reverse queries. There are two possible reverse queries and two corresponding results: one using the matching entities, which we will call the short response the other using the matching items which we will call the long response. The first finds all (detail) selectors associated with any one of the matching entities and in this example it is the set $d_1$ 102, $d_2$ 104, and $d_3$ 106. The second, as a first step, finds all entities associated with the matching items. In this example, it is $e_1$ 112, $e_2$ 114, $e_3$ 116, $e_4$ 118, $e_5$ 120, and as the second step, finds all selectors associated with at least one of these entities, which, in this example, gives the set of selectors $d_1$ 102, $d_2$ 104, $d_3$ 106, $d_4$ 108. The item counts calculations of each selector in both the short and the long responses are the same. The short response list of selectors is shown, or enabled in all detail selector groups in the subject entity group, when the user is in the editing state of that entity. Editing state means that the user can edit their choice of selectors describing the current entity. The long response list of selectors is shown, or enabled when the user indicates he/she has finished describing the current entity and wishes to narrow the matching items further by describing another entity to be matched in the currently matching items. It is also used in all entity groups that are not in the editing state. Lists of detail selectors available for the user to choose from are updated to the corresponding detail selectors. In this example, if the user were to continue in the entity editing state, GIA would allow him/her to choose from the detail selectors $d_1$ 102, $d_2$ 104, and $d_3$ 106.

After the he/she indicates the desire to describe another entity, having completed the editing of the current one, GIA would identify detail selectors $d_3$ 106 and $d_4$ 108 (in addition to $d_1$ 102 and $d_2$ 104) as having an association with the identified matching items $i_1$ 122, $i_3$ 126, and $i_5$ 130 and make them available for additional entity description. The calculated item counts, using the methods described here, could be made available to the user in each case.

Figure 2:
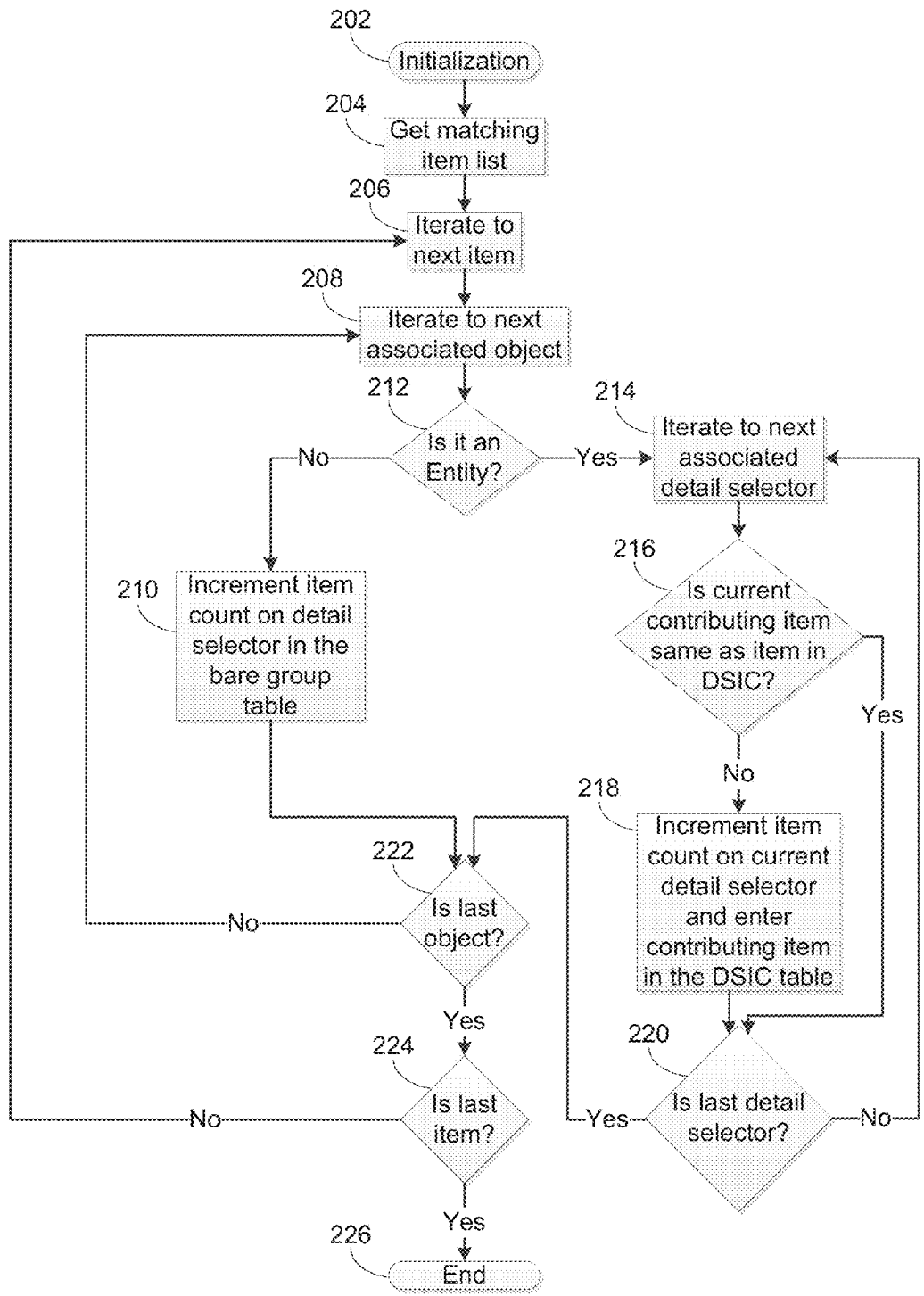
FIG. 2 illustrates a flow chart of an exemplary method for counting the number of matching items for each associated detail selector.

When providing related detail selectors for subsequent selection, some embodiments calculate and provide the number of matching items and additionally or alternatively the number of matching entities for each detail selector that may subsequently be chosen. FIG. 2 illustrates a flow chart of an exemplary method for counting matching items associated with each detail selector that may subsequently be selected. Referring to FIG. 2, after each time a user selects a detail selector, the method prepares for item counting in the initialization step 202 by setting the Item Count (304 in FIG. 3A) and Contributing Item Field (306 in FIG. 3A) for every detail selector to a numerical "0" and a "NULL," respectively. Then with a given set of matching items already identified as matching the forward query comprised of the user-selected detail selectors (e.g. the method gets a matching item list/set 204), the method iterates through the matching items. Choosing the next item $i_{next}$ 206, the method temporarily stores and retains the item identification (i.e. "$i_{next}$") of this next item $i_{next}$ and traverses through all of the detail selectors directly and indirectly associated with the item $i_{next}$. This ensures that every relevant detail selector (i.e. those associated with a matching item) is updated with the appropriate item count, where an intermediate entity exists between an item and a detail selector.

In a current entity group which is in the editing state, only the detail selectors associated with matching entities and any bare group selectors matching items (i.e. only those detail selectors in the "short list") are made available to the user for subsequent selection. The detail selectors associated with matching items but not necessarily with matching entities (i.e. those detail selectors unique to the "long list") are made available to the user in all entity groups not in the editing state.

Direct and Indirect Associations

FIG. 1 shows a detail selector (i.e. $d_5$ 110) that is directly associated with an item (i.e. $i_4$ 128). A detail selector is directly associated with an item, or alternatively an item is directly associated with a detail selector, if they are linked together without using any other nodes in the link between them. Selectors directly associated with items are by definition in a bare group. A detail selector (for example, $d_1$ 102) is indirectly associated with an item (i.e. $i_5$ 130), or alternatively an item (i.e. $i_5$ 130) is indirectly associated with a detail selector (i.e. $d_1$ 102), if there is at least one node (i.e. entities $e_2$ 114 and $e_3$ 116) in the link between them. Each addition level/line (i.e. line of entities) in between detail selectors and items allows more information to be coupled with the levels/lines above (i.e. detail selectors) and below (i.e. items, or other entities). Often the user does not actually see or know of the entities in between the detail selectors and items, but in some cases it can be very beneficial for the user to be aware of them, such as the case where entities represent persons associated with crime incidents/police reports. In other cases it may be useful to give the user control of entities in formulating the query.

Vectors/Matrices Establish Data Structure and Links:

Associations between detail selectors and entities, as also entities and items, or directly between detail selectors and items, can be usefully visualized as three binary valued matrices, or tables sometimes also called bitmaps. For example, the Detail Selector-Item association matrix would be a matrix in which each row represents a detail selector and each column an item. An example 330 is depicted in FIG. 3C, in which an existing association between selector 316 $d_j$ and item 318 $i_g$ is stored as the value 1 in the cell 336 which is in row j and column g. If the association between these was not present, then cell 336 would store the value 0. The total matrix of zeros and ones is thus a binary valued matrix or bit-map. Each row and column of such a matrix is called the corresponding bit vector. Fox example, in the Detail Selector-Item matrix, the row vector is called the detail selector vector and the column vector is the item vector. The whole matrix is usually stored as an array of vectors, though not necessarily as bit-vectors. More efficiently each vector is stored as an array of sorted IDs of the corresponding associated elements. So for example, each detail selector vector is stored as an array of sorted numbers, each number corresponding to the column number of the item (which is usually also its ID) associated with the detail selector.

Figure 3A:
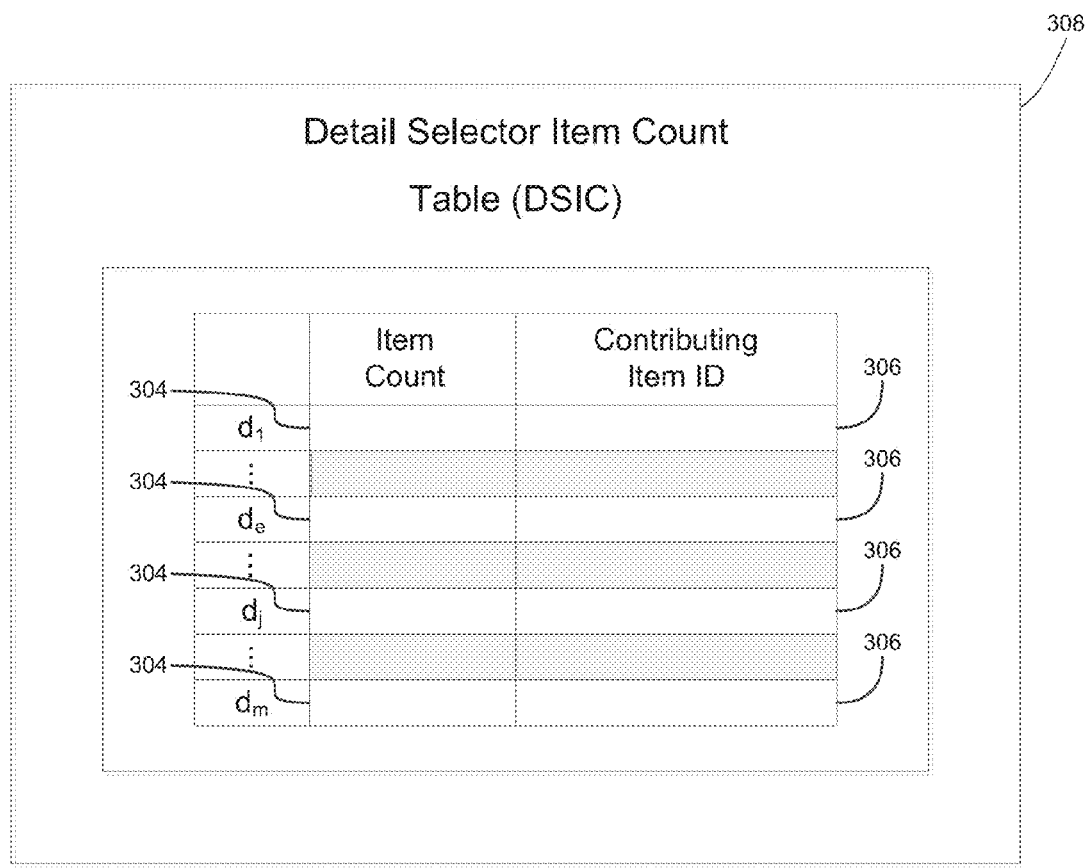
FIG. 3A illustrates exemplary data structures used for item counting.
Figure 3B:
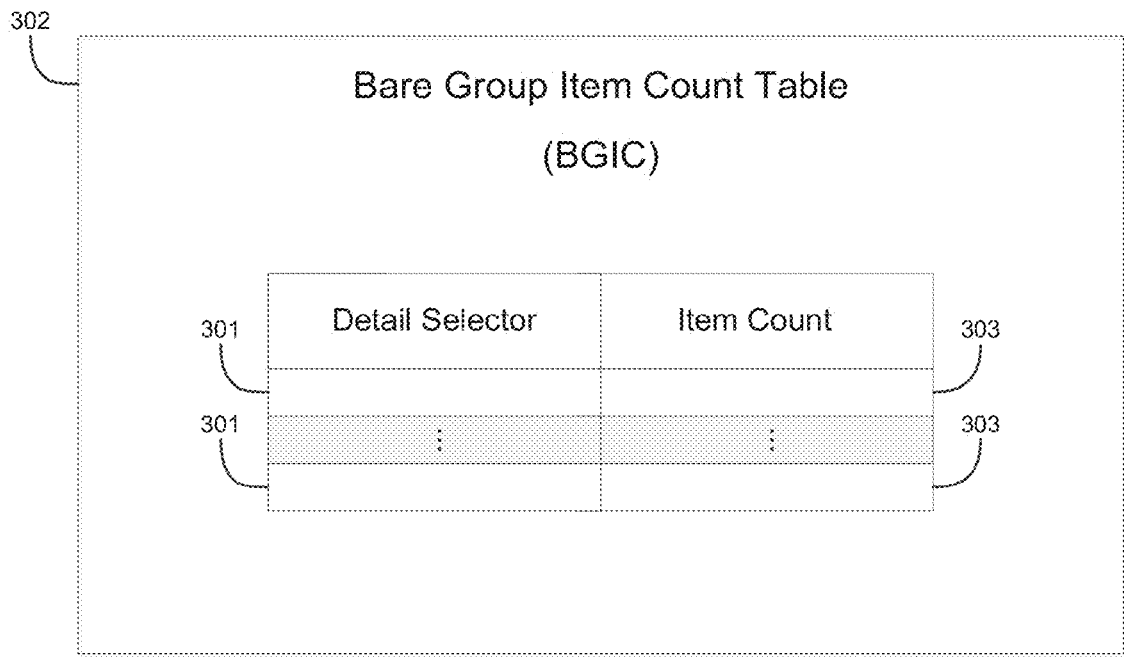
FIG. 3B illustrates exemplary data structures used for item counting.
Figure 3C:
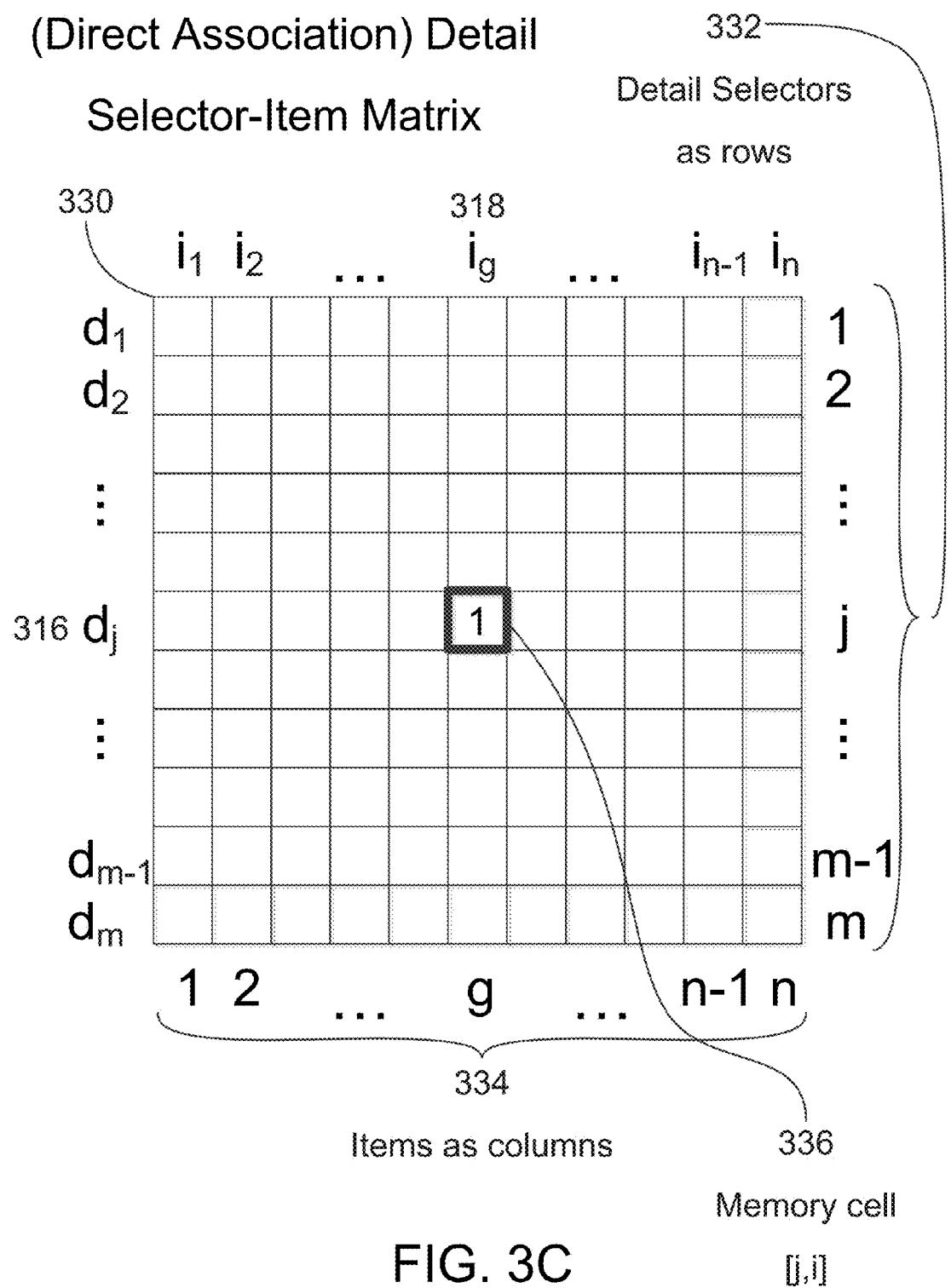
FIG. 3C illustrates exemplary data structures used for item counting and for representing data associations in databases.
Figure 3D:
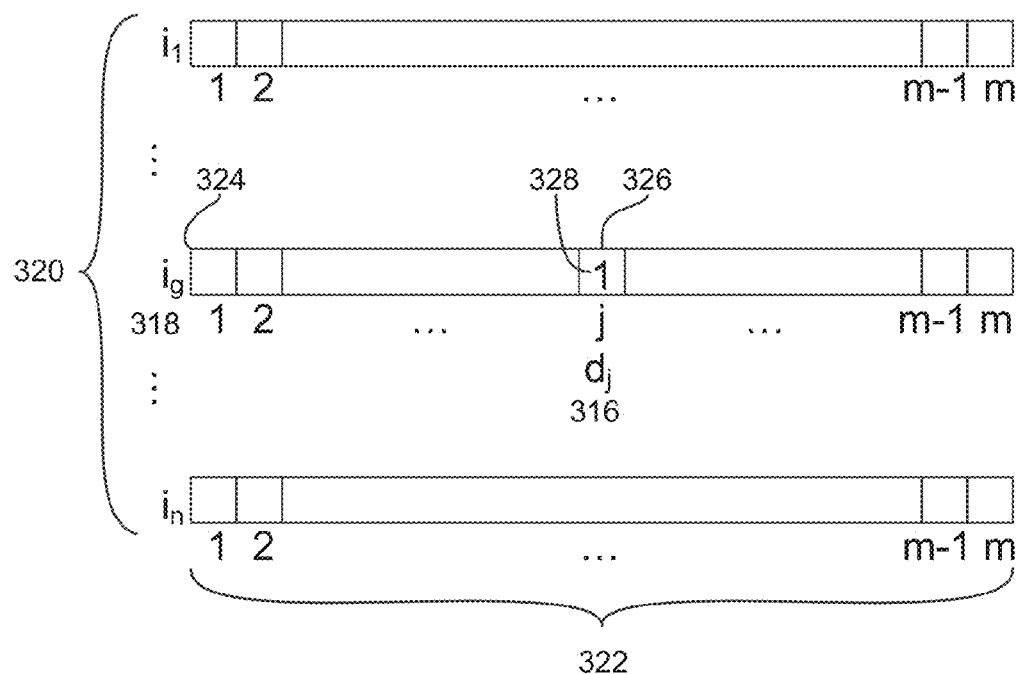
FIG. 3D illustrates exemplary data structures used for item counting and for representing data associations in databases.

FIG. 3A and FIG. 3B show possible data structures for implementing the methods of some embodiments. For traversing through directly associated detail selectors, item vectors (Item-Detail Selector vectors) 320 may be used, as illustrated in FIG. 3D. For each of n item vectors 320 (i.e. one vector for each of items $i_1$ through $i_n$), there are m cells 322 for m detail selectors. If $i_g$ 318 is directly associated with $d_j$ 316, then slot number j 326 in $i_g$'s item-detail selector vector 324 will hold a binary "1" 328. If $i_g$ 318 and $d_j$ 316 are not directly associated, then there will be a binary "0." These vectors are created and set up with the appropriate binaries ("1" or "0" depending on the existence of direct associations) prior to the item counting.

In systems using entities, there are also often detail selectors that do not associate with any entities, such as the example in FIG. 1 of the association between $d_5$ 110 and $i_4$ 128. Such detail selectors are said to belong to a bare group. They describe the whole data item rather than some part of it. The association of such bare group detail selectors can be stored in a (direct association) detail selector-item matrix, as illustrated in FIG. 3C.

Figure 3E:
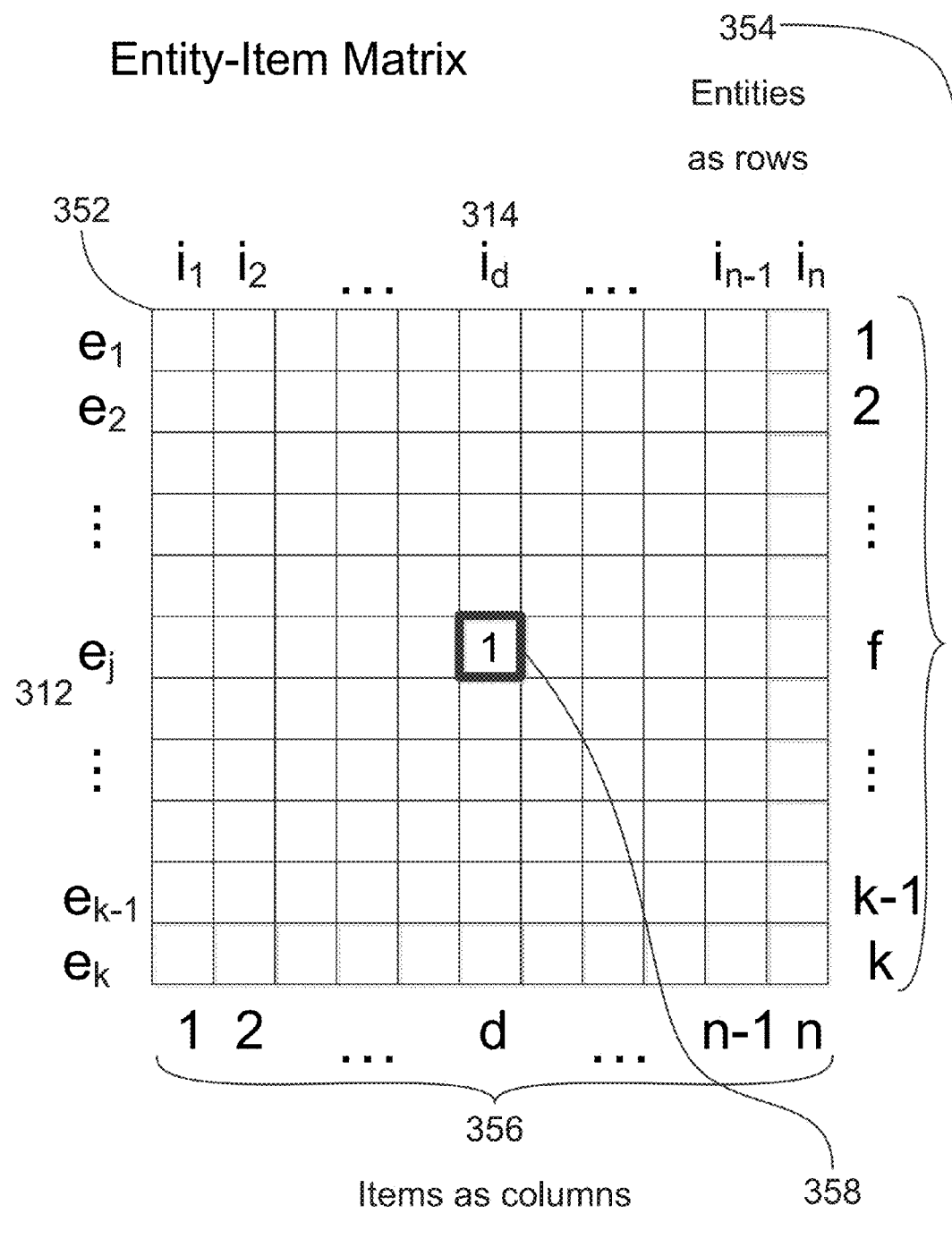
FIG. 3E illustrates exemplary data structures used for item counting and for representing data associations in databases.
Figure 3F:
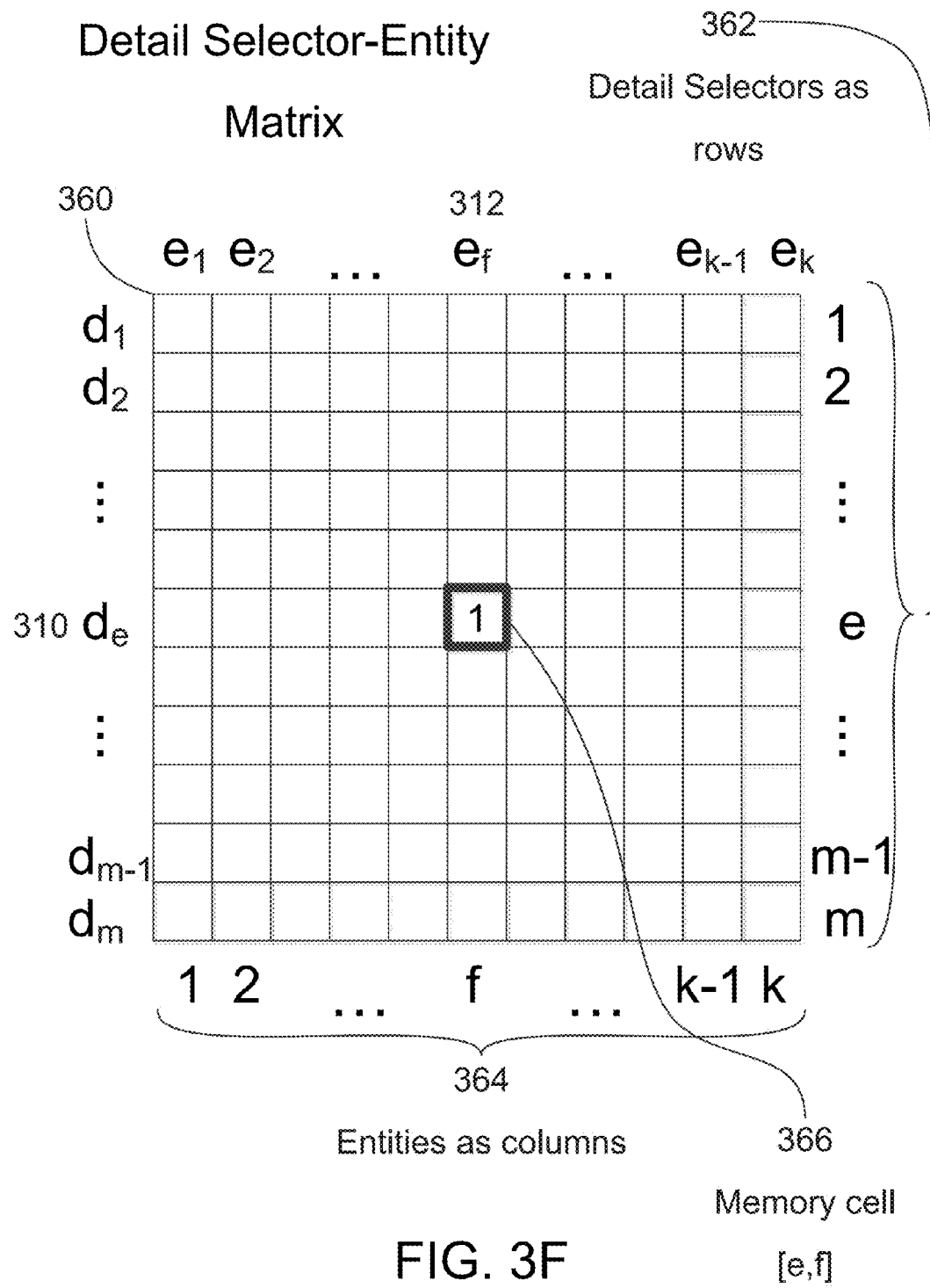
FIG. 3F illustrates exemplary data structures used for item counting and for representing data associations in databases.

Associations of detail selectors with entities and then those entities with items are normally represented by two matrices, exemplified by matrices 352 and 360 in FIG. 3E and FIG. 3F, respectively. However, for determining associated item counts and other evaluations of the reverse query, it is possible to condense the two matrices into one (indirect association) detail selector-item matrix (e.g. product matrix) showing the association of detail selectors with items through entities. Such a matrix cannot be used for determining the items matching a Boolean query comprised of details selectors because of data ambiguity already described. However the matrix can be used for an alternative method of calculating item counts associated with each available selector. Using this condensed matrix is more efficient than the use of the two matrices, but requires the extra initialization time to create such a matrix from the two and may also require additional RAM.

Referring back to FIG. 3C, the detail selector-item matrix may preferably be created and set up before the item counting takes place. From the above description details, one having ordinary skill in the art would know how the method uses these vectors and/or matrices to determine associations for traversing. However, it should be noted that the method is not limited to using these vectors and matrices and can be implemented in other similar ways.

FIGS. 3E, 3F, 3H, and 3I illustrate the use of vectors and matrices that may be used when traversing through indirectly associated detail selectors by way of entities to evaluate query results. The use of entities in GIA introduces an additional dimension of complexity and intricacy while supporting the search for multiple entities within items. For each additional level/line (i.e. line of entities) between a line of items and a line of detail selectors, there are additional vectors, matrices, and/or matrix dimensions. As mentioned previously, additional levels/lines of intermediate entities may allow for searches of items which contain second level entities, i.e. entities that in turn are contained within other entities, and distinguish between multiple second level entities within an item.

Figure 3G:
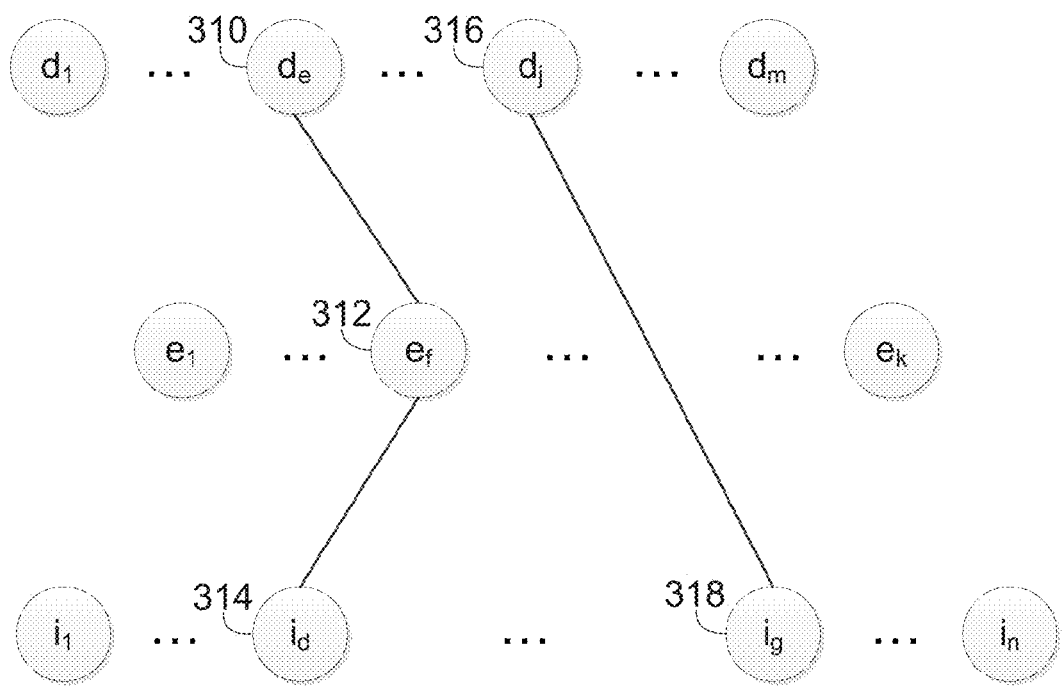
FIG. 3G illustrates an association graph of an exemplary database having detail selectors with direct and indirect associations to items.
Figure 3H:
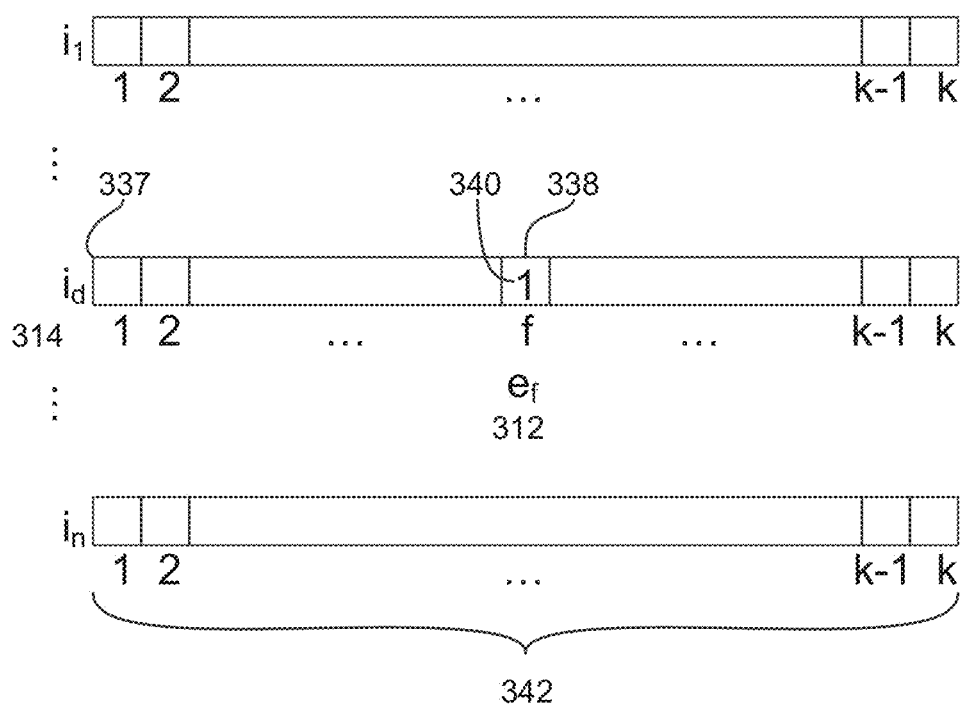
FIG. 3H illustrates exemplary data structures used for item counting and for representing data associations in databases.
Figure 3I:
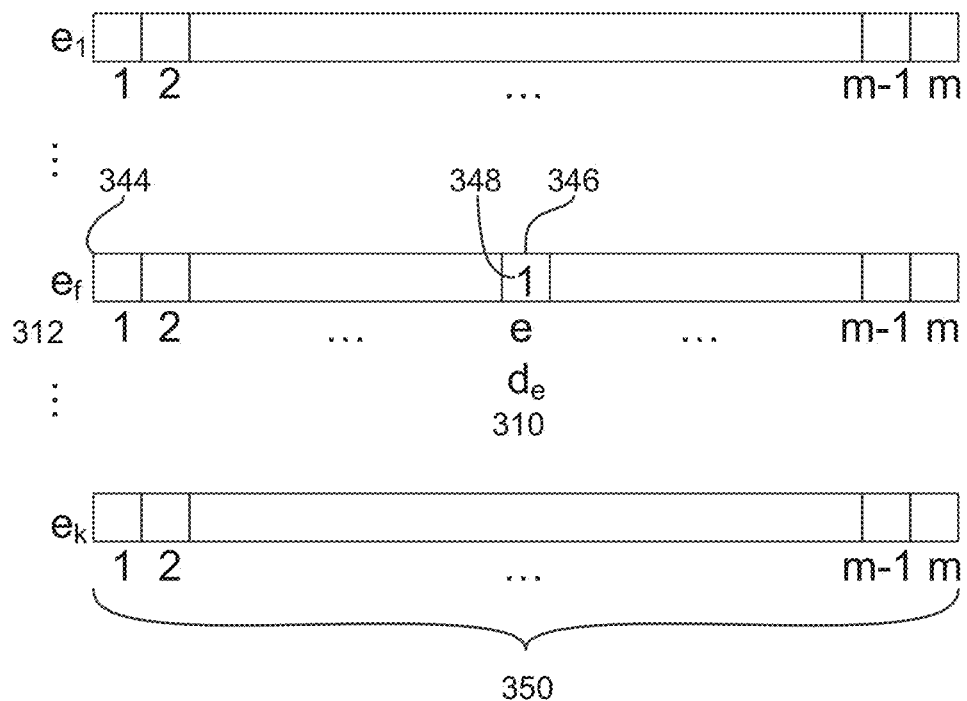
FIG. 3I illustrates exemplary data structures used for item counting and for representing data associations in databases.

In FIG. 3G, since item $i_d$ 314 is indirectly associated with detail selector $d_e$ 310 through entity $e_f$ 312, then there will need to be an item-entity vector 337 for $i_d$ (see FIG. 3H) and an entity-detail selector vector 344 for $e_f$ (see FIG. 3I). In FIG. 3H, the item-entity vectors will have k memory cells 342 for k entities. For example, memory slot number f 338 will hold a binary "1" 340 because $i_d$ 314 and $e_f$ 312 are directly associated. This is one way of representing that item $i_d$ and entity $e_f$ are directly associated. Moreover, in FIG. 3I, the entity-detail selector vector 344 for $e_f$ 312 will have m memory cells 350 for m number of detail selectors. Memory cell e 346 will hold a binary "1" 348 because entity $e_f$ 312 and detail selector $d_e$ 310 are directly associated. The above vectors are preferably established before the item counting occurs.

These vectors can also be parts of matrices. In the example depicted in FIGS. 3E, 3F, 3H, 3I, there are two matrices, an entity-item matrix 352 (FIG. 3E) and a detail selector-entity matrix 360 (FIG. 3F). Item-Entity vectors (FIG. 3H) can be the columns 356 to form the entity-item matrix 352 (FIG. 3E). Entity-Detail Selector vectors (FIG. 3I) can be the columns 364 to form the detail selector-entity matrix 360 (FIG. 3F). If item $i_d$ 314 and entity $e_f$ 312 are directly associated (FIG. 3G), then the memory cell at row f and column d (memory slot [f,d] 358) in the entity-item matrix 352 (FIG. 3E) will hold a binary "1," otherwise a "0." Similarly, if entity $e_f$ 312 and detail selector $d_e$ 310 are directly associated (FIG. 3G), then the memory slot at row e and column f (memory slot [e,f] 366) in the detail selector-entity matrix 360 (FIG. 3F) will hold a binary "1," otherwise a "0." These matrices are also preferably established before the item counting takes place to avoid unduly increasing response time. One having ordinary skill in the art would know from the descriptions presented here how the method uses these vectors and matrices to determine associations for traversing. However, it should be noted that the method is not limited to using these vectors and matrices and can be implemented in other similar ways.

For example, the detail selector-item matrix (e.g. as shown FIG. 3C) can be and preferably is implemented as an array of detail selector vectors for quick access to each vector. Alternatively, or additionally, the same matrix can be implemented as an array of item vectors (e.g. as shown in FIG. 3D) for quick access to each vector. Each vector can, for example be implemented as an array of bits, each either zero or 1, or as an array of (preferably sorted) integers, where each integer is the array index of a non-zero bit in the array of bits implementation. Each vector can be stored compressed using any useful compression method(s).

Evaluating Item Count for Each Associated Detail Selector

FIG. 3A illustrates the structure of the detail selector item count (DSIC) table 308 used to store item counts of items associated indirectly (through entities) with (detail) selectors. Each row identifies a detail selector and the first column 304 stores the item count (or tally) while the second column 306 stores the last count-contributing item's identification. Table 302 in FIG. 3B is used for storing the item counts of selectors directly associated with items, that is of selectors in the bare group.

Referring back to FIG. 2, FIG. 3A, and FIG. 3B, each time the associated item counts need to be evaluated, the initialization process 202 starts with each selector's contributing item ID element 306 (in DSIC table 308) storing some indicator equivalent to a "NULL" and each item count element 304 (in DSIC table 308) and 303 (in BGIC table 302) storing zero. For a given set of matching items (matched by a Boolean expression comprising the chosen detail selectors), the method gets the matching item list at 204, iterates to the next item at 206, and for each item, iterates through all of the objects (either entities or selectors) associated with the item at 208, determines if the associated object is an entity at 212 (and so indirectly associated with selectors), or a selector directly associated with the item. If the current item ($i_{current}$) is directly associated with selectors (result of query 212 is "No"; the current object is a selector), then the current object's/selector's count 303 in table 302 of FIG. 3B (Bare Group Item Count Table) is incremented 210. If the current object (e.g. current selector) is not the last object 222, the method moves on to the next object 208 and continues this process. If the current object is the last 222, then the method determines whether the current item is the last item 224; if not, the method iterates to the next item 210 and continues; if so, the method is complete 226.

If the current item ($i_{current}$) is associated with entities (result of query 212 is "Yes"; the current object is an entity), and so indirectly associated with detail selectors, the method iterates to the next detail selector 214 associated with the current object/entity. Next it is determined, at 216, if the previously contributing item ID in DSIC 308 ("$i_{previous}$") for the current detail selector is different from $i_{current}$. If the contributing item's ID ("$i_{previous}$") is different from that of $i_{current}$, the current detail selector's contributing item field is updated to the identification of $i_{current}$, (e.g. "$i_{current}$") and the current detail selector's item count/tally will be incremented at 218. If, however, the contributing item's ID ("$i_{previous}$") is the same as that of $i_{current}$, the contributing item field and the item count/tally of the current detail selector will not be altered. If the current detail selector is not the last 220, then the next detail selector will be processed at 214. If the current selector is the last 220, then the method determines whether or not the current object (e.g. current entity) is the last object 222. If not, the method moves on to the next object 208 and continues this process. If the current object is the last 222, then the method determines whether the current item is the last item 224; if not, the method iterates to the next item 210 and continues; if so, the method is complete 226. In this way, the iteration process continues through all matching items. This process ensures that a single matching item is not counted more than once.

When all detail selectors directly and indirectly associated with each of the matching items have been traversed and their respective item counts updated, the method provides matching item counts for each of the "long list" detail selectors (those associated with the matching items through the entities). In most enterprise databases, the method provides the user with the complete response, generally in a second or less, and does so following each detail selector chosen by the user.

Figure 4:
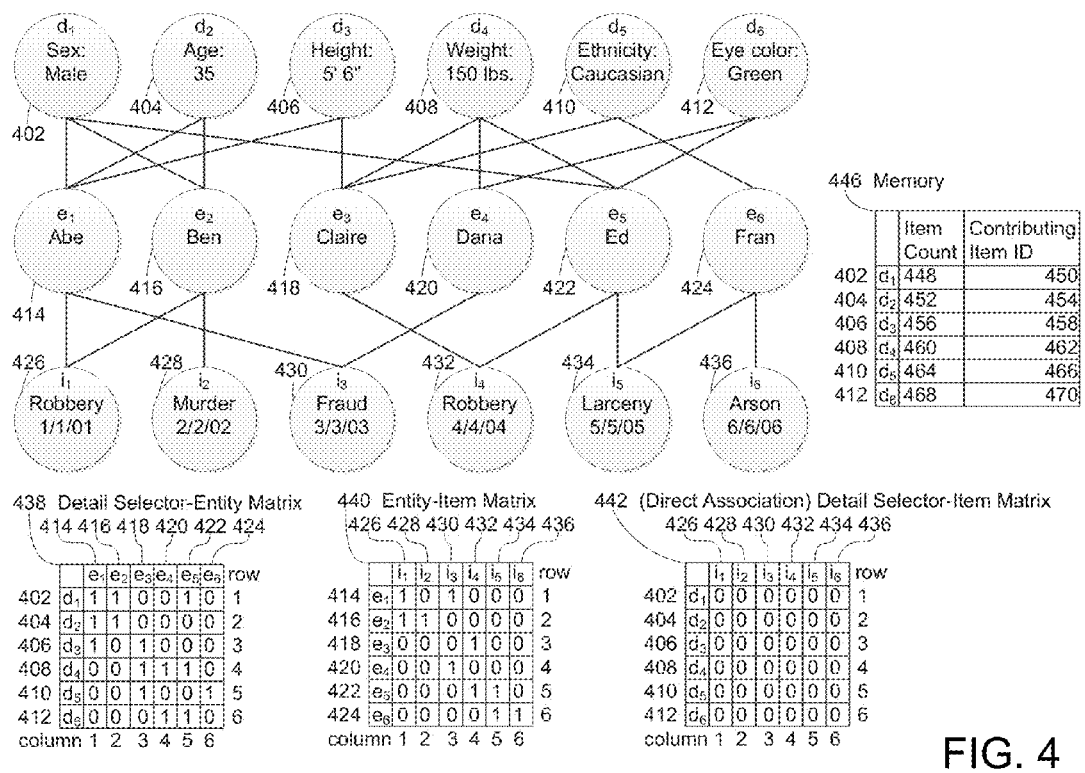
FIG. 4 illustrates an exemplary criminal database search according to one embodiment.

FIG. 4 illustrates an exemplary method as applied to searching in a crime database. In this example, the detail selectors $d_1$ through $d_6$ (402, 404, 406, 408, 410, 412) describe characteristics of the people (i.e. suspects, criminals), each of whom is denoted by an entity, from $e_1$ to $e_6$ (414, 416, 418, 420, 422, 424). The people, or entities 414, 416, 418, 420, 422, 424, are associated with police reports/crime incidents, which are denoted by items $i_1$ through $i_6$ (426, 428, 430, 432, 434, 436). Although vectors or other similar approaches could be taken, in this example a detail selector-entity matrix 438 stores the direct associations between the detail selectors 402, 404, 406, 408, 410, 412 and the entities 414, 416, 418, 420, 422, 424, while an entity-item matrix 440 stores the direct associations between the entities 414, 416, 418, 420, 422, 424 and the items 426, 428, 430, 432, 434, 436.

This example briefly illustrates the notion of detail selector groups. Each detail selector $d_1$ to $d_6$ (402, 404, 406, 408, 410, 412) actually belongs to its own respective detail selector group, which usually contains a multitude of detail selectors. For the purposes of simplicity, this example only shows one detail selector from six different detail selector groups (sex, age, height, weight, ethnicity, eye color). As shown in the graph representation, the detail selector $d_1$ "Male" 402 from the detail selector group "Sex" is directly associated with entities $e_1$ "Abe" 414, $e_2$ "Ben" 416, and $e_5$ "Ed" 422. The other people's sexes are either not "Male" or unknown to the database at this time. (For purposes of simplicity, detail selectors "Female," "Other," "Unknown," etc. within the detail selector group "Sex" are not shown in this example.) Because detail selector $d_1$ "Male" 402 is directly associated with entities $e_1$ "Abe" 414, $e_2$ "Ben" 416, and $e_5$ "Ed" 422, the memory slots at row 1 and columns 1, 2, and 5 in the detail selector-entity matrix 438 will each have a binary "1" while the other columns in row 1 will each have a binary "0."

Furthermore, as illustrated in the graph representation, the entity $e_1$ "Abe" 414 is directly associated with items $i_1$ "Robbery Jan. 1, 2001" 426 and $i_3$ "Fraud Mar. 3, 2003" 430. This means that "Abe" was involved with a robbery incident on Jan. 1, 2001 and a fraud incident on Mar. 3, 2003, but not with the other reports/crimes to the knowledge of the database. As such, the memory slots at row 1 and columns 1 and 3 in entity-item matrix 440 will each hold a binary "1" while the other columns in row 1 each hold a binary "0." Again, vectors or other similar approaches rather than matrices could be used instead.

A user of such a database, such as a police officer, may want to find certain suspect(s) or criminal(s) associated with a certain incident(s) or crime(s), but may not know or remember much about the suspect(s) or incident(s). For example, the officer may only know that a 35 year-old male was involved. When the officer chooses and selects detail selectors $d_1$ "Sex: Male" 402 and $d_2$ "Age: 35" 404, the method performs a forward query, identifying all the directly and indirectly associated matching items (i.e., all criminal reports referring to a 35 year-old male). The method may first search the (direct association) detail selector-item matrix 442 for any directly associated items. There are none in this particular example; each of the memory slots in the detail selector-item matrix 442 hold a binary "0." The method may next search the detail selector-entity matrix 438 for entities that are directly related to the conjunction of the selected detail selectors, comparing $d_1$ 402 and $d_2$ 404 ("Sex: Male" and "Age: 35") to determine whether they share any columns having "1" (i.e. whether the conjunction of $d_1$ 402 and $d_2$ 404 result in any matching entities). Since $d_1$ 402 is directly associated with $e_1$ 414, $e_2$ 416, and $e_5$ 422, and since $d_2$ 404 is directly associated with $e_1$ 414 and $e_2$ 416, the conjunction of $d_1$ 402 and $d_2$ 404 will result in matching entities $e_1$ 414 and $e_2$ 416. This means that in this database only $e_1$ "Abe" 414 and $e_2$ "Ben" 416 are both male and 35 years-old.

As can be seen in entity-item matrix 440, (matching) entities $e_1$ 414 and $e_2$ 416 are also disjunctively directly associated with items $i_1$ 426, $i_2$ 428, and $i_3$ 430 because $e_1$ 414 is directly associated with $i_1$ 426 and $i_3$ 430, and $e_2$ 416 is directly associated with $i_1$ 426 and $i_2$ 428. These items $i_1$ "Robbery Jan. 1, 2001" 426, $i_2$ "Murder Feb. 2, 2002" 428, and $i_3$ "Fraud Mar. 3, 2003" 430 are thus the matching items resulting from the officer's choice of detail selectors $d_1$ "Sex: Male" 402 and $d_2$ "Age: 35" 404. This means that by selecting $d_1$ "Sex: Male" 402 and $d_2$ "Age: 35" 404, the officer will have located three crime incidents/police reports, one about a robbery on Jan. 1, 2001 ($i_1$ 426), another about a murder on Feb. 2, 2002 ($i_2$ 428), and a third one about a fraudulent act on Mar. 3, 2003 ($i_3$ 430), after sending a request to the database server.

Referring to FIG. 2 and FIG. 4, with the matching items found (getting the list of matching items) 204, the method can now proceed to calculate the item count/tally for each detail selector associated with these matching items 204. The item counting process will tell the officer which detail selectors are associated with these three matching items and are available for selection, because the only available selectors are those whose associated item counts are non-zero. The process will also tell the officer how many matching items will result if he/she were to subsequently choose/select one or more of these other available detail selectors. The officer can then select from these other available detail selectors to narrow or refine his/her search.

Proceeding with the item counting process, the method then performs a reverse query by traversing back from $i_1$ 426 to all of its directly and indirectly associated detail selectors. The method checks for any detail selectors directly associated with $i_1$ 426 (i.e. the next object associated with the current item $i_1$ is not an entity, at query 212) using the detail selector-item matrix 442, and, if any, increments the item count 210 of the current selector. In this example, there are none because each of the memory slots in the detail selector-item matrix 442 has a binary "0."

The method moves on to look for detail selectors indirectly associated with $i_1$ 426 (i.e. the next object associated with the current item $i_1$ is an entity thereby indirectly associating the current item with detail selectors, at query 212). The method does so by traversing each entity directly associated with $i_1$ 426 using the entity-item matrix 440. The method finds that $e_1$ 414 and $e_2$ 416 are directly associated with $i_1$ 426 because each of the memory slots at rows 1 and 2 and column 1 (memory slots [1,1] and [2,1]) in the entity-item matrix 440 has a binary "1." The method then iterates 208 to each of these entities $e_1$ 414 and $e_2$ 416 and through 214 each detail selector directly associated with each of these entities $e_1$ 414 and $e_2$ 416. In this example, $e_1$ 414 directly associates with $d_1$ 402, $d_2$ 404, and $d_3$ 406, and $e_2$ 416 directly associates with $d_1$ 402 and $d_2$ 404. This is because there is a binary "1" in the detail selector-entity matrix 438 for each of memory slots [1,1], [2,1], and [3,1], as well as [1,2] and [2,2].

Beginning with $d_1$ 402 (traversing from $e_1$ 414), the method compares 216 $d_1$'s contributing item field in DSIC table 446 with the current item ID, which is $i_1$'s identification (not illustrated in figure). Detail selector $d_1$'s contributing item field 450 is presently "NULL" (not illustrated) because $d_1$ 402 has not yet been traversed; the initialization step 202 ensures that all detail selectors have "0" item counts/tallies and "NULL" contributing item fields in the beginning. "NULL" is different from $i_1$'s identification and as such $d_1$'s item count/tally 448 is incremented 218 to a numerical "1" and its contributing item field 450 updated to (i.e. replaced with) the identification of $i_1$ (not illustrated). The method continues looping 214, 216, 218, 220, through all detail selectors associated with entity $e_1$ (in this example, $d_1$, $d_2$, $d_3$). Following that, it repeats the whole process for the next entity (object) 208, and then the next item 206, until all items in the matching set have been traversed. At that point the method has completed 226 the counting of the numbers of matching items associated with each detail selector and is ready to provide this data.

Moreover, the method can be used initially, with the NULL or empty query, to determine and display the initial item counts associated with every selector in the data. As a user chooses selectors to add to the query, the system automatically creates a Boolean expression comprised of the chosen selectors, determines the matching items and performing the described steps to determine the matching item counts associated with each selector. Usually the selectors with zero counts are not displayed, marked distinctively, and/or disabled.

The above description of item counting methods is but one possibility. The following describes another, which for reference we will call the single matrix method. This method creates a matrix of (indirect) item to detail selector associations.

Single Matrix Method

In order to make the calculation of associated item counts both simpler and faster, in some embodiments, a single matrix method can be used. This improves the performance quite appreciably, at the expense of some additional pre-processing time needed to create the single matrix from the multiple matrices. However, this binary matrix product can be evaluated during initialization when, for some database applications, the time spent may be quite acceptable.

In matrix language, referring to FIG. 4 examples, the required single matrix is the result of the matrix product of the entity-item matrix 440 and the detail selector-entity matrix 438. The result is the product matrix (or Indirect Association Detail Selector-Item) 448 (see FIG. 5). One method of evaluating this product matrix begins by traversing each item-to-entity vector, in the example columns 426, 428, 430, 432, 434, 436 in entity-item matrix 440 in FIG. 4. Its components are the associated entities, in the example 414, 416, 418, 420, 422, 424. Each entity component in turn corresponds to an entity-to-detail selector vector (columns 414, 416, 418, 420, 422, 424) in the detail selector-entity matrix 438, each of these vectors has detail selectors as components and are checked for at least one common component. In the example, the first column item-to-entity vector 426 in matrix 440 would have the entities $e_1$, $e_2$, as components. The first row detail selector-to-entity vector 402 in matrix 438 would have the entity components $e_1$, $e_2$, $e_5$. If at least one of the entity components is present in both vectors (in the example, $e_1$ and $e_2$ are present in both), then the association between the item ($i_1$) and the detail selector ($d_1$) exists and a binary "1" is entered into the corresponding cell (e.g. [1,1]) of the product matrix 448 (FIG. 5), otherwise it does not and a zero is entered in the corresponding cell of the product matrix. In this method the checking of common entity components can terminate after the first common one is encountered.

Alternatively, and in most cases more optimally, the same two matrices 440 and 438 are used. Traverse the item-to-entity vectors (item vectors) in example matrix 440 (columns 426, 428, 430, 432, 434, 436). For each item vector, determine the disjunction of every entity-to-detail selector corresponding to each item vector's entity component. That is, determine the union set of detail selectors associated with every entity vector corresponding to the component entities in the current item vector in example matrix 438 (for item $i_1$, the component entities are $e_1$, $e_2$). The resulting union set of detail selectors are the components of the current item-to-detail selector vector corresponding to the current item ($i_1$). The principal method step in this process is the evaluation of the disjunction between two entity vectors. This is the elemental method step used in calculating the disjunction of many entity vectors as follows. The first vector is disjoined with the next one and the result placed in the longer vector of the two. Then this result vector is disjoined with the next vector and so on until all vectors have been disjoined. The last vector holds the result set of detail selectors which is the set of components of the current item vector. The following are further details of one possible method of carrying out this elemental step. There are of course other possible methods so that this method is not meant to be limiting in any way.

The two entity vectors (in the example when the current item vector is $i_1$, in matrix 438 in FIG. 4, $e_1=[d_1, d_2, d_3]$ and $e_2=[d_1, d_2]$) are implemented in two different forms: the longer of the two ($e_1$ in the example) would be implemented as (or converted to) a bit vector or bit map (example $e_1=111000$) whereas the shorter of the two would be (remain) an array of IDs (row numbers) of the associated detail selectors, that is an ID vector (in the example, $e_2=[1, 2]$). Then the disjunction can be carried out and stored in the bitmap vector, by using the components of the shorter vector (1, 2) to address each corresponding bit position in the bitmap vector and write a 1 to it (without the need to check if it is 1 already). In this example, the 1st and the 2nd bits of the bitmap vector would be written to, even though they are already 1. This operation is very fast. In this example, the result would be which, in this very small example, accidentally happens to be the same as the $e_1$ vector. An example of the procedure steps for evaluation of the result of the disjunction of two (entity) vectors, corresponding to the first two components of the current item, is as follows:

1 Start with two entity vectors in ID representation
2 Convert the longer of the two entity vectors to bitmap representation (bit vector)
3 Iterate through each component of the (shorter) entity vector and use each component to turn on the corresponding bit in the bit vector
4 Dispose of the shorter vector and replace it with the next vector in the ID representation
5 Iterate through each component of the current vector and use each component to turn on the corresponding bit in the bit vector
6 Repeat from step 4 until finished.

The above procedure is evaluated for each item in the data set. The output of the above is a bitmap representation of a set of detail selectors associated with the current item. Therefore it represents the components of the item-to-entity vector for the current item. Repeating the process for each item results in the item-to-entity vector which can then be used to determine the counts of matching items associated with each selector. This is a simple counting method where a table of selector IDs holds the current count for each selector and this count is incremented each time the respective selector is visited when traversing the selectors associated with each matching item.

Extension to More General Applications

Both the single matrix and the double matrix methods can be easily extended to the case of multiple levels of entities. The single matrix method can be extended by repeating the iteration through the entities for each subsequent additional layer of entities.

Both methods can also be used to just determine the items associated with a given detail selector, rather than to determine item counts. More generally, items, entities and detail selectors can be any set of related objects where the relations between them can be represented similarly to those between items, entities, and detail selectors.

One example of slightly more general objects is the case of animals (for example, horses) each represented by an object. Then the first level of objects could be the first generation of a set of animals. The second level of objects, each connected to its parents at the first level, would be the next generation of the animals. The third level objects, each connected to its parent at the second level, would then be the third generation. And so on. Then in the case of just three levels, item counting method would count the number of (or the list of) third generation offspring from each first generation parent. Relationships between people communicating on social web sites is another example.

Figure 6:
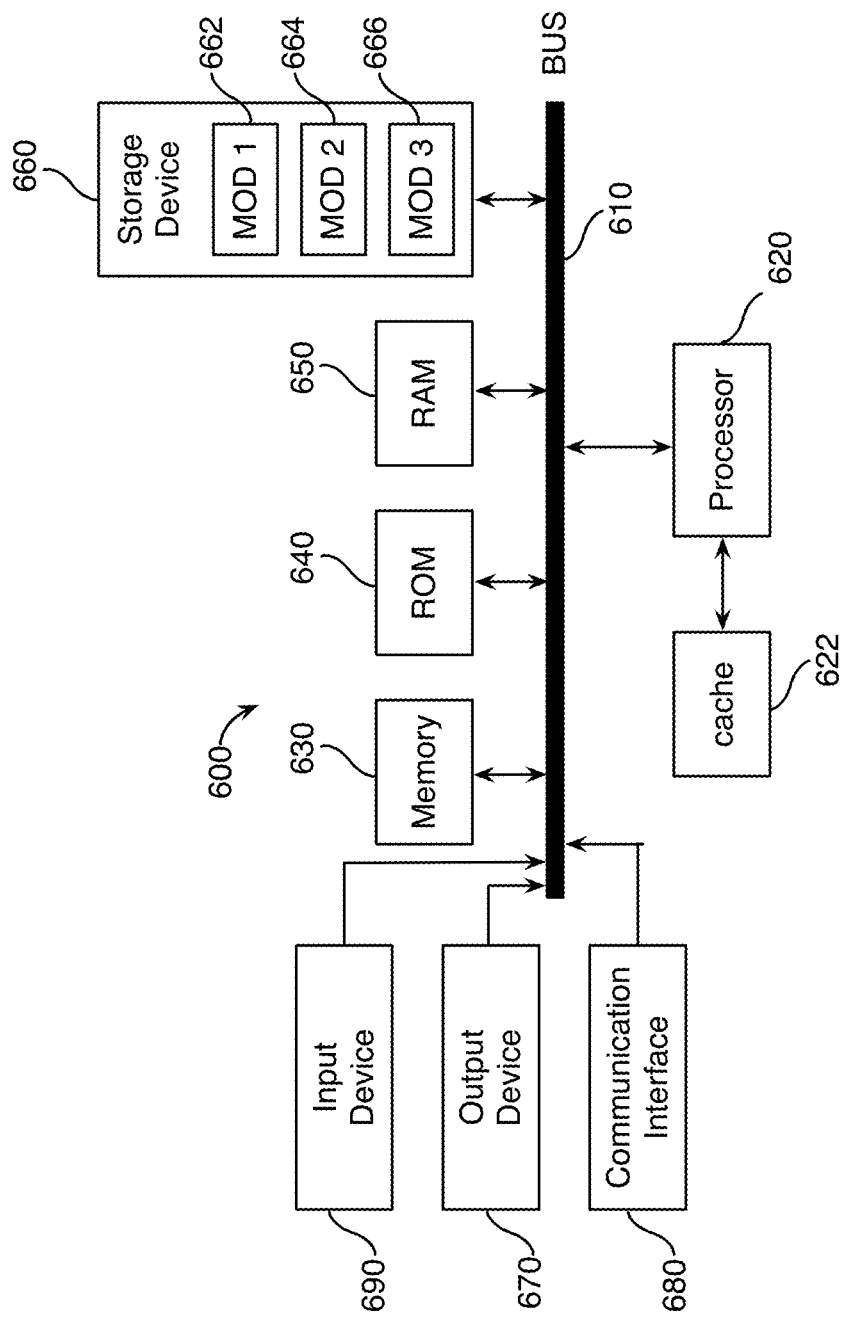
FIG. 6 illustrates an example system embodiment.

These variations shall be discussed herein as the various embodiments are set forth. The disclosure now turns to FIG. 6. With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer readable storage media provide nonvolatile storage of computer readable instructions, data structures, program modules and other data for the computing device 600. In one aspect, a hardware module that performs a particular function includes the software component stored in a non-transitory computer-readable medium in connection with the necessary hardware components, such as the processor 620, bus 610, display 670, and so forth, to carry out the function. The basic components are known to those of skill in the art and appropriate variations are contemplated depending on the type of device, such as whether the device 600 is a small, handheld computing device, a desktop computer, or a computer server.

Although the exemplary embodiment described herein employs the hard disk 660, it should be appreciated by those skilled in the art that other types of computer readable media which can store data that are accessible by a computer, such as magnetic cassettes, flash memory cards, digital versatile disks, cartridges, solid state drives, random access memories (RAMs) 650, read only memory (ROM) 640, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations discussed below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited non-transitory computer-readable storage media. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM, Solid State Drive, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A computer-implemented method comprising:
uniquely identifying, using a computing device, from a plurality of items in a database stored in a computer system, uniquely identified items having indirect associations with a plurality of detail selectors through one or more intermediate entities, wherein the indirect associations can be represented as a complete multipartite graph in which detail selectors, the intermediate entities, and items are represented as vertices, their associations are represented as edges, the detail selectors are adjacent to the entities, and the entities are adjacent to the uniquely identified items; and
for the plurality of detail selectors, using the computing device, determining a count of the uniquely identified items which are associated with each of the plurality of detail selectors by counting paths between each item and each particular detail selector and storing, for uniquely identified items associated with the particular detail selector, a unique identifier of a counted item with an identifier of the particular detail selector to prevent double counting.

2. The computer-implemented method of claim 1, further comprising:
providing a list of available detail selectors, the available detail selectors being available for selection;
updating the list of available detail selectors in response to a selection of one of the detail selectors, the updating resulting in a list of now available detail selectors including detail selectors which can be combined in a query with the selected detail selector, the result of each query matching one or more of the identified items.

3. A computer-implemented method comprising:
uniquely identifying, using a computing device, from a plurality of items in a database stored in a computer system, uniquely identified items having indirect associations with a plurality of detail selectors through one or more intermediate entities, wherein the indirect associations can be represented as a complete multipartite graph in which detail selectors, the intermediate entities, and items are represented as vertices, their associations are represented as edges, the detail selectors are adjacent to the entities, and the entities are adjacent to the uniquely identified items and counting the uniquely identified items associated with each of the detail selectors, the counting comprising:
determining if an identified item is associated with a particular detail selector;
determining if an identifier of the identified item associated with the particular detail selector is stored with an identifier of the particular detail selector;
if the identifier of the identified item associated with the particular detail selector is not stored with the identifier of the particular detail selector, retaining an identification of the identified item with the identifier of the particular detail selector, and counting the identified item;
if the identifier of the identified item associated with the particular detail selector is stored with the identifier of the particular detail selector, not further counting the identified item; and
totaling the counts to result in a total count of the identified items associated with the particular detail selector.

4. A non-transitory computer-readable medium having computer-readable instructions stored thereon effective for causing a computer to perform a method comprising:

identifying, using a computing device, in a database stored in a computer system, items having indirect associations with a plurality of detail selectors through one or more intermediate entities, wherein the indirect associations can be represented as a complete multipartite graph in which detail selectors, the intermediate entities, and items are represented as vertices, their associations are represented as edges, the detail selectors are adjacent to the entities, and the entities are adjacent to the uniquely identified items; and for the plurality of detail selectors, using the computing device, determining a count of the identified items which are associated with each of the plurality of detail selectors by counting paths between each item and each particular detail selector and storing, for uniquely identified items associated with the particular detail selector, a unique identifier of a counted item with an identifier of the particular detail selector to prevent double counting.

5. The non-transitory computer-readable medium of claim 4, further comprising:

subsequent to identifying the items having an indirect association with a selected detail selector, performing a reverse entity search comprising the uniquely identified items and a disjunctive Boolean operator, the search resulting in an identification of all entities matching the reverse entity search.

6. The non-transitory computer-readable medium of claim 5, further comprising:

subsequent to identifying the entities matching the reverse entity search, performing a reverse detail selector search comprising the entities matching the reverse entity search and a disjunctive Boolean operator, the search resulting in an identification of all detail selectors matching the reverse detail selector search.

7. The non-transitory computer-readable medium of claim 6, wherein identifying the one or more items in the computer system comprises:

performing a forward entity search comprising detail selectors and a Boolean operator, the search resulting in an identification of entities matching the forward entity search;

performing a forward item search comprising the entities matching the forward entity search and a disjunctive Boolean operator, the search resulting in an identification of items matching the forward item search, thereby the items in the computer system are identified.

* * * * *